United States Patent
Fiore

(10) Patent No.: US 12,073,275 B1
(45) Date of Patent: Aug. 27, 2024

(54) LINEAR DISPLACEMENT MEASUREMENT SYSTEM

(71) Applicant: Metal Goods Manufacturing, Inc., Bartlesville, OK (US)

(72) Inventor: Joseph C. Fiore, Fort Worth, TX (US)

(73) Assignee: Metal Goods Manufacturing, Inc., Bartlesville, OK (US)

( * ) Notice: Subject to any disclaimer, the term of this patent is extended or adjusted under 35 U.S.C. 154(b) by 134 days.

(21) Appl. No.: 17/846,118

(22) Filed: Jun. 22, 2022

Related U.S. Application Data

(60) Provisional application No. 63/213,449, filed on Jun. 22, 2021.

(51) Int. Cl.
*G06K 19/077* (2006.01)
*G06K 7/10* (2006.01)

(52) U.S. Cl.
CPC ..... *G06K 19/0776* (2013.01); *G06K 7/10099* (2013.01); *G06K 19/07773* (2013.01)

(58) Field of Classification Search
CPC ........... G06K 19/0776; G06K 7/10099; G06K 19/07773; G07C 9/00111; G06Q 10/087; G08B 13/2454; H04B 17/318
See application file for complete search history.

(56) References Cited

U.S. PATENT DOCUMENTS

| | | | |
|---|---|---|---|
| 7,451,789 B2 | 11/2008 | Fiore | |
| 10,108,936 B1 | 10/2018 | Garner | |
| 10,746,866 B2 | 8/2020 | Alkhabbaz | |
| 2009/0313068 A1* | 12/2009 | Boerkei | G06Q 50/32 700/224 |
| 2015/0177051 A1 | 6/2015 | Hudson et al. | |
| 2017/0305682 A1* | 10/2017 | Wallace | B65G 15/36 |
| 2022/0149896 A1* | 5/2022 | Cunningham, IV | G06K 7/10356 |

FOREIGN PATENT DOCUMENTS

| | | |
|---|---|---|
| CN | 107425257 | 12/2017 |
| DE | 102007027171 | 1/2009 |
| JP | 2021032167 | 3/2021 |
| KR | 20070037198 | 4/2007 |
| KR | 20150026031 | 3/2015 |

\* cited by examiner

*Primary Examiner* — Vernal U Brown
(74) *Attorney, Agent, or Firm* — Head, Johnson, Kachigian & Wilkinson, PC

(57) ABSTRACT

A linear displacement measurement system and method having a plurality of RFID transponders arranged in a linear array; a movable reciprocating device upon which said plurality of RFID transponders are mounted; a stationery RFID reader configured to wirelessly receive data from said plurality of RFID transponders; and a central processing unit and memory in communication with said stationery RFID reader configured to convert data from said RFID transponders to position information and linear displacement information of said movable device.

18 Claims, 9 Drawing Sheets

LINEAR DISPLACEMENT MEASUREMENT SYSTEM

BACKGROUND OF THE INVENTION

1. Cross Reference

This application is based on and claims priority to U.S. Provisional Patent Application No. 63/213,449 filed Jun. 22, 2021.

2. Field of the Invention

The present invention is directed to a linear displacement measurement system. In particular, the present invention is directed to a linear displacement measurement system using Radio Frequency Identification (RFID) transponders and an RFID reader to determine movement, position and displacement information.

3. Description of the Related Art

Radio Frequency Identification (RFID) technology uses wireless radio waves to communicate with an RFID that is tuned to the same frequency. An RFID system consists of at least one reader/transmitter and one RFID transponder. The RFID transponder, tag or label contains data and information on the object to which it is attached. Functionally, it conveys similar information to a bar code, however, tags can be serialized and unique. Unlike bar codes, RFID does not require direct line-of-sight and is not affected by surface scratches or marking. RFID can function in dirty, oily, industrial applications.

RFID technology development has accelerated over the past decade. Several categories have emerged—low frequency (~125 KHz), high frequency (~13.56 MHz) and Near Field Communication (NFC). Transponder sizes have continued to shrink. Transponder sizes are now available as small as 1.5 mm×1.5 mm×0.8 mm. Typical RFID technology applications include the following:

Inventory management
Asset tracking
Personnel tracking
Counterfeit prevention
Controlling access to restricted areas
ID Badging
Supply chain management Transponder integrated circuits (ICs) are often enclosed in fluid tight housings, such as in plastic rectangular boxes and formed on a flexible plastic strip such as shown on FIG. 1.

In one non-limiting example, the transponders are packaged 4 mm apart on center on a strip. This strip can be mounted to a moving device or object (e.g., tape measure, x-y table, conveyer belt, pull cord, etc.) in a linear array. An RFID reader is mounted at a fixed location. Optionally, an antenna, mounted in the reader or externally, can be designed to read one transponder IC at a time. As the array passes by the RFID reader, the RFID reader scans each transponder. Since each transponder has a unique ID or serial number, the RFID reader software can identify when the next tag on the reel has passed by. Because each transponder is mounted a set distance apart, every time a new transponder is read, it indicates that the device or object has moved the set distance.

The present invention measures linear displacement of a movable device. Each RFID has a serial number and unique ID. As the transponders move past a fixed RFID antenna, the antenna reads the RFID transponder and transmits information data to an RFID reader which interprets the data. Every time a new transponder is read, it indicates that the device or object has moved a fixed distance. In this manner, linear distance displacement can be accurately measured.

SUMMARY OF THE INVENTION

In general, in a first aspect, the invention relates to a linear displacement measurement system. In one embodiment, the system comprises: a plurality of RFID transponders arranged in a linear array; a movable reciprocating device upon which said plurality of RFID transponders are mounted; a stationery RFID reader configured to wirelessly receive data from said plurality of RFID transponders; and a central processing unit and memory in communication with said stationery RFID reader configured to convert data from said RFID transponders to position information and linear displacement information of said movable device.

The movable device may reciprocate linearly parallel to said linear array of said plurality of RFID transponders.

The plurality of RFID transponders may each be arranged at a fixed distance apart.

The central processing unit may collect said data from said RFID reader.

The plurality of RFID transponders may be arranged on a strip affixed to said movable device. The strip may be a plastic adhesive tape.

The RFID reader may include a stationery reader antenna. The RFID reader and the reader antenna may be together encased in a housing.

The movable reciprocating device may be a gauge rod of a liquid level measuring device. The liquid level measuring device may further comprise a liquid float wherein movement of said float translates to movement of said gauge rod. The liquid level measuring device may further comprise a temperature sensor.

Each RFID transponder in said plurality of RFID transponders may be programmed with linear measurement data corresponding to the RFID transponder's position in said linear array.

The previously received data may be stored in the memory such that the central processing unit may determine a direction of travel of the movable reciprocating device by comparing currently received data with previous data.

In a second aspect, the invention relates to a method to measure linear displacement, which method comprises: affixing a plurality of RFID transponders arranged in a linear array on a movable reciprocating device; wirelessly receiving data from said plurality of RFID transponders at a stationery RFID reader as said device moves; converting said data from said plurality of RFID transponders with a central processing unit and memory into position information and linear displacement of said movable device.

The movable device may reciprocate linearly parallel to said linear array of said plurality of RFID transponders.

The plurality of transponders may be arranged at fixed distances apart.

The plurality of RFID transponders may be arranged on a strip affixed to said movable device. The strip may be a plastic adhesive tape.

Each RFID transponder in said plurality of RFID transponders may programmed with linear measurement data corresponding to the RFID transponder's position in said linear array.

The previously received data may be stored in the memory such that the central processing unit may determine a direction of travel of the movable reciprocating device by comparing currently received data with previous data.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
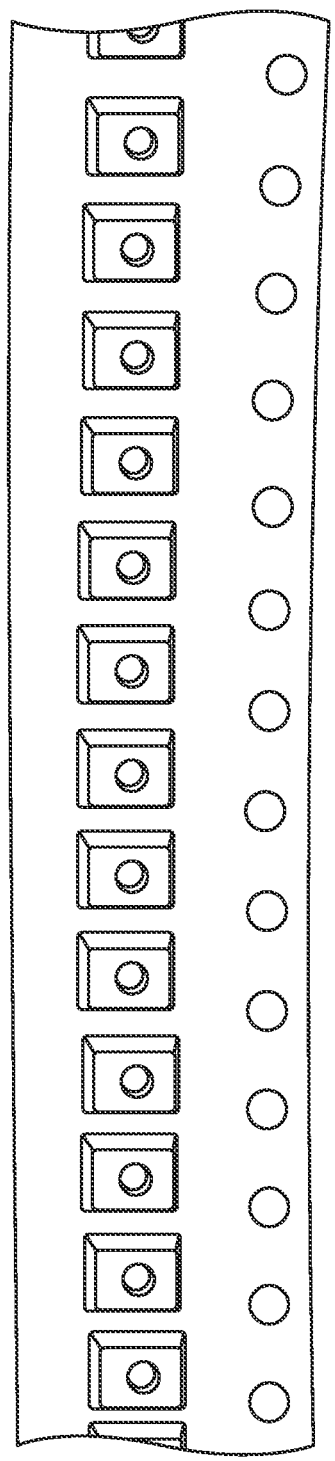
FIG. 1 illustrates a plurality of Radio Frequency Identification (RFID) transponder chips in fluid tight housings on a flexible plastic strip.
Figure 2:
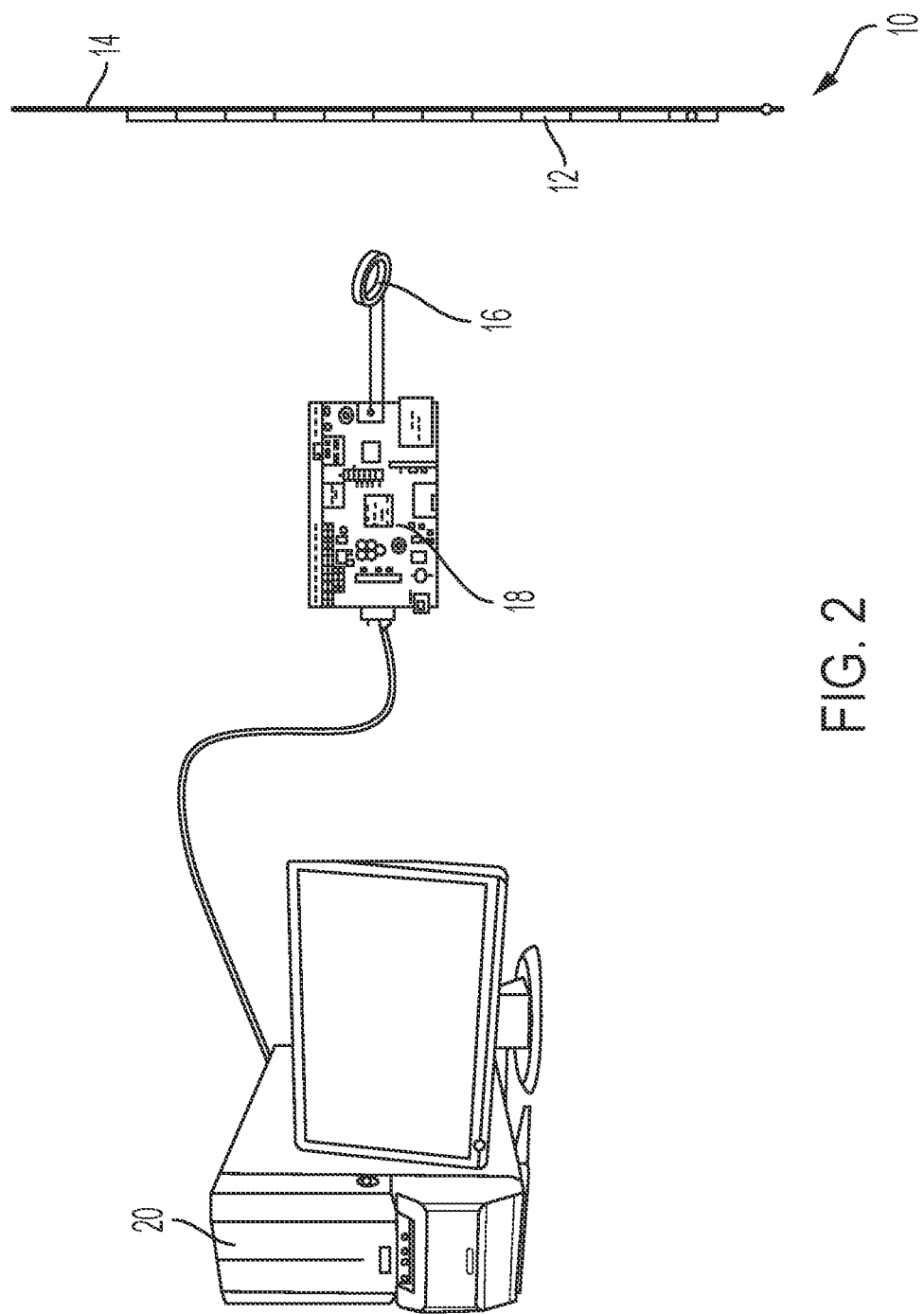
FIG. 2 illustrates a simplified diagrammatic view of one possible configuration of an RFID linear displacement measurement system constructed in accordance with the present invention.
Figure 3:
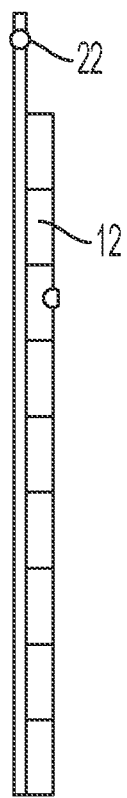
FIG. 3 illustrates an example of a plurality of RFID transponders affixed to a reciprocating movable device.

One possible configuration or embodiment of an RFID linear displacement system 10 in accordance with the present invention is shown in FIG. 2.

The system 10 includes a plurality of RFID transponders 12 arranged in a linear array, each transponder 12 capable of receiving and sending data. The plurality of RFID transponders 12 are arranged in a linear array and affixed to a movable reciprocating device 14.

The present invention includes small, RFID transponder ICs affixed or mounted to a flexible plastic strip 22. The small size of the RFID transponder ICs, for example 3 mm×3 mm×0.85 mm or less, allows for the mounting of the transponders onto the plastic strip 22.

Figure 4:
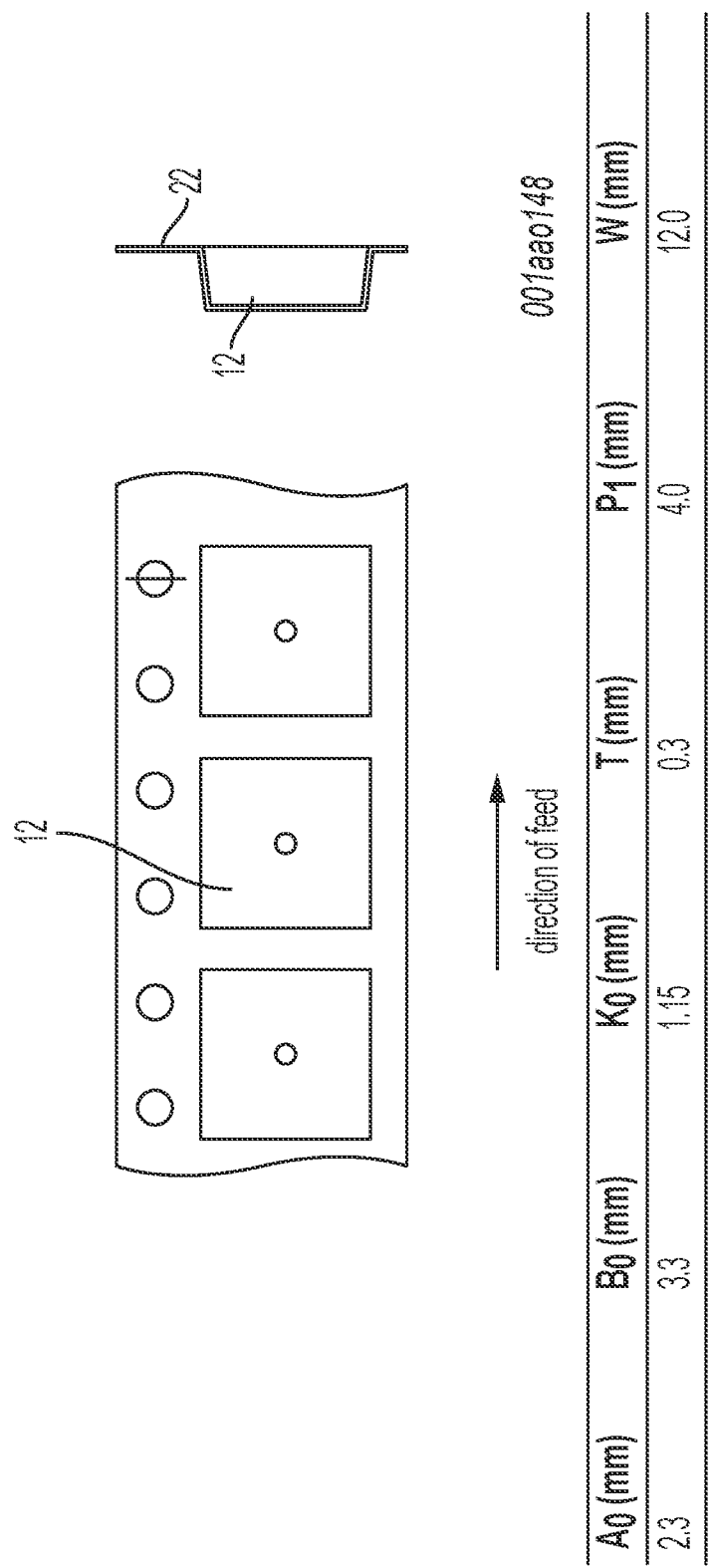
FIG. 4 illustrates an enlarged diagrammatic view of the plurality of RFID transponders.

For example, one specific configuration of the transponders is shown in FIG. 4. This configuration shows 2 mm×3 mm×1.15 mm (nominal) RFID transponder ICs. Each of the transponders are encased in a fluid tight housing.

The fixed mounting spacing between transponder ICs (P1 in FIG. 4) on the strip permits and determines precision of measurement of the RFID linear displacement system.

The present invention also includes a tuned reader antenna 16 and an RFID reader 18. The reader 18 includes a central processing unit, software, and optional display (to be described.) The antenna 16 is placed near the movable device 14 and connected to the RFID reader 18. The reader antenna 16 sends out a specific radio frequency signal matched to the transponder 12 and a request for data. When a transponder 12 tuned to the same frequency picks up the signal, it uses the energy from the transmission (i.e., energy harvesting) and responds to the interrogation from the reader 18. This transmission and reception are defined in prior art of RFID technology.

The system in FIG. 2 shows a central processing unit with memory or a PC 20 connected via USB to the reader 18. The reader 18 may also include a display for displacement measurement value, historical data logging, graphical user interface (GUI) and other additional functionality.

The system processes data from the transmission from the RFID transponder (i.e., label or tags). The transponder 12 will respond with a serial number or tag ID. Since this ID is unique, the reader software captures every tag ID or tag serial number and stores it to memory. The transponder reader 18 and the antenna 16 are maintained in a fixed location. As the transponders, mounted on a strip 22 in close proximity (<1 inch) to the reader, move past the reader at a fixed distance, in a single linear bi-directional axis of travel, the reader 18 collects the transponder ID or serial number and compares it to the previous transponder stored in memory. If it is different, this indicates that the movable device 14 has moved to the next transponder. This movement equates to the distance between the fixed transponders locations on the strip. The spacing between transponders is programmed into the reader 18. Therefore, when a new transponder is read, the reader software translates the reading of the new transponder as one unit of displacement.

In another version, each RFID tag in the strip may be programmed to hold its particular position value. For example, if each RFID tag on the strip is 4 mm apart, the first tag scanned is programmed with the value "4 mm," the second is programmed with "8 mm," the third is programmed with "12 mm" and so on. Accordingly, when the RFID reader reads the RFID tags, it will receive the position value of that particular RFID tag without having to perform any calculations or reference any databases.

Because previous transponders and the current transponders are stored in the reader memory, the reader 18 can interpret the direction of strip travel by noting if a new transponder is read, indicating forward motion, or the previous transponder is read, indicating backward motion.

The present system has many applications where non-contact, dirty, hazardous environment, linear displacement measurement is required and line-of-sight or ultraviolet solutions have not been suitable. The RFID linear displacement measurement system can be applied to many applications once a suitable, compatible packaging or encapsulation of the RFID transponder strip can be made.

One non-limiting application of the RFID linear displacement measurement system is for use as a liquid level measurement gauging in railroad tank cars.

Figure 5:
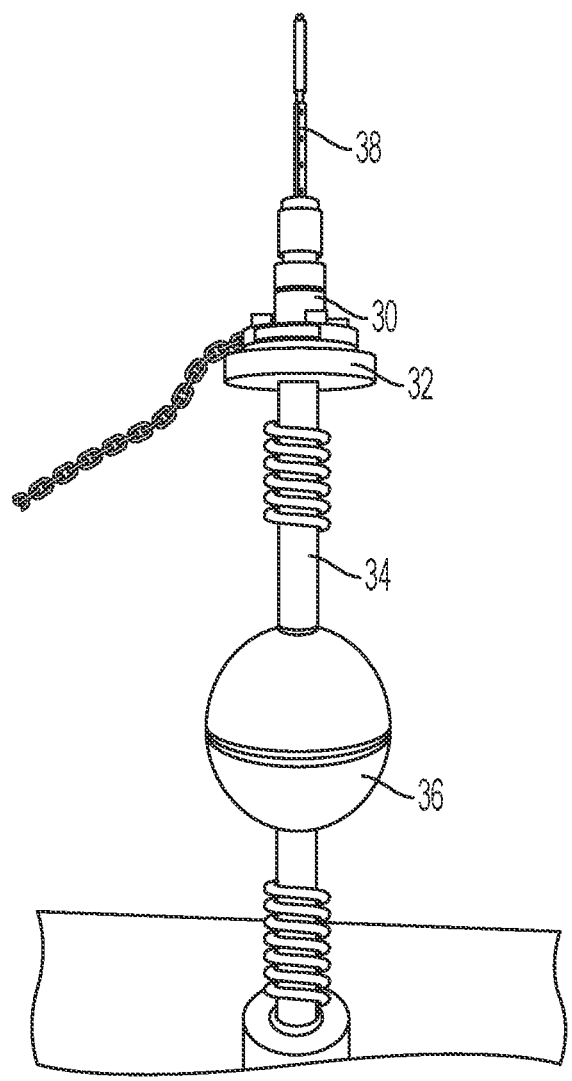
FIG. 5 illustrates a preferred embodiment of the present invention in a linear displacement measurement system for liquid level measurement in a railroad tank car.

A standard liquid level measurement device apart from the tank is shown in FIG. 5. The unit in FIG. 5 is a demonstration version of the actual device. A gauging device body 30 mounts onto the top of a manway cover plate 32 which closes and seals an opening in the tank (not shown). A sealed guide tube 34 is welded to the underside of the cover plate 32 and extends into the tank car (not shown). Its length is such that the device can provide 48" or 60" of liquid level measurement. The flange shown in FIG. 5 is a scaled representation of the actual manway cover plate used on a railroad tank car.

A buoyant float 36 surrounds and is permitted to move on the sealed guide tube in response to the level of liquid in the tank.

A ring magnet is mounted to the bottom of a gauge rod 38 which passes into the sealed guide tube 34. There is another ring magnet inside the float 36 near the bottom. At time of manufacture, a scale is affixed to the top of the gauge rod 38 based on tank car installation mounting dimensions and the calculated float line based on the commodity specific gravity.

To commence liquid level measurement, the gauge rod 38 is pulled up in the sealed guide tube 34 until the gauge rod magnet couples with the float magnet. Once the magnets are coupled, the gauge rod 38 will protrude from the body 30, as shown in FIG. 5, and is now ready to measure the liquid level in the tank car once the level reaches the point where there is 60 inches or 48 inches of empty space (referred to as outage) in the tank. The gauge rod 38 will now rise or lower through the body 30 as the float 36 rises or lowers with the commodity liquid level in the tank car.

Figure 6:
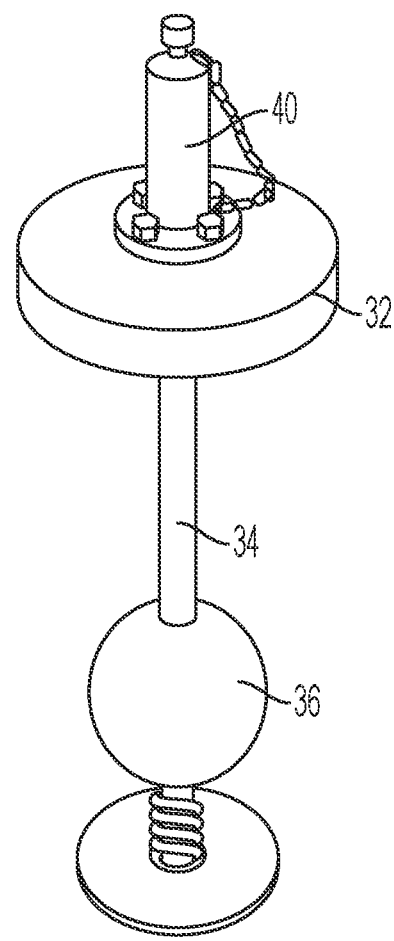
FIG. 6 is the linear displacement system shown in FIG. 5 in a transportation position.

When the gauging device is stowed and prepared for travel with the tank car, the gauge rod is pushed down and uncoupled from the float magnet. A cap 40 is screwed onto the gauging device body and the tank car is prepared for transit as shown in FIG. 6.

For liquid level measurement in railroad tank cars, the RFID linear displacement measurement system 10 can be used to provide electronic display of the liquid level.

Figure 7:
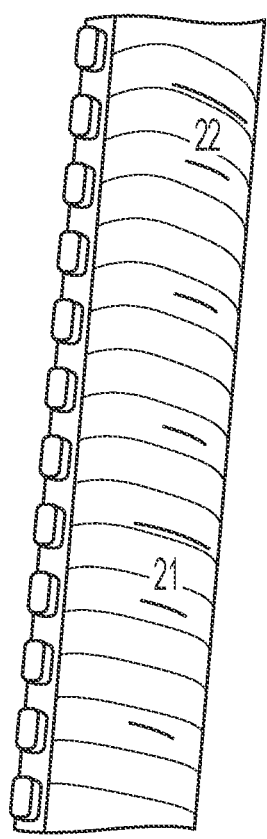
FIG. 7 is an enlarged view of a portion of a reciprocating movable device, the flexible strip and the plurality of RFID transponders.

The RFID transponder strip 22 is affixed to the back of the gauge rod 38 as shown in FIG. 7. The RFID transponder strip 22 is affixed such that the readout of each incremental transponder 12 aligns with the gradations of the scale. For example, the RFID strip is affixed to the gauge rod 38 such that each reading of a new transponder 12 will correspond with a ¼ inch movement of the gauge rod.

Figure 8:
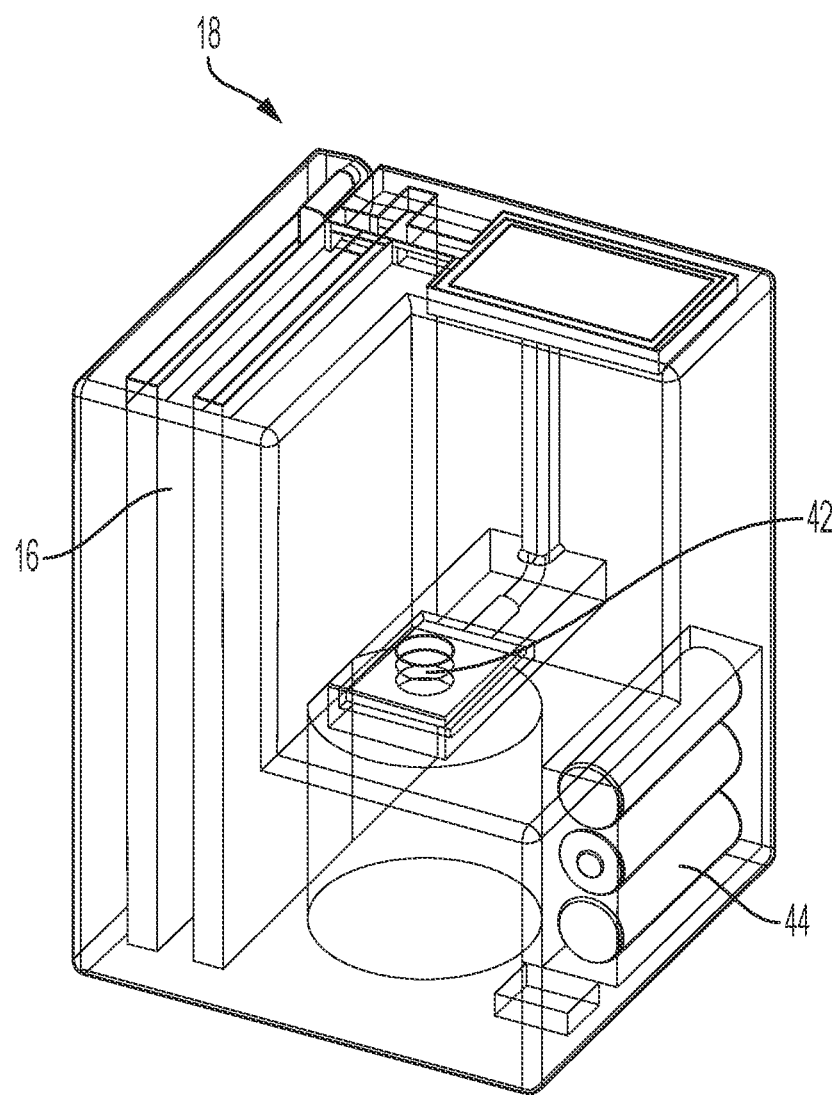
FIG. 8 is a diagrammatic view of an RFID reader and an antenna of the present invention.

An RFID reader 18 and an antenna 16 for the railroad tank car gauging application is shown in FIG. 8. The reader 18 and antenna 16 are shown embedded in a plastic fluid tight housing. An opening 42 passes through the housing to receive the gauge rod with the RFID transponders mounted thereon. The unit is battery powered with rechargeable batteries 44.

The RFID linear displacement measurement system 10 may be utilized such that the tank car liquid level gauging device with the manual liquid level measurement provided by the existing device is maintained. Accordingly, a dual or redundant liquid measurement system is provided. By applying the RFID linear displacement measurement system of the present invention in this manner, the functionality of the industry standard gauging device is maintained providing a failsafe backup in the event of a loss of battery power or malfunction of the RFID system.

Figure 9:
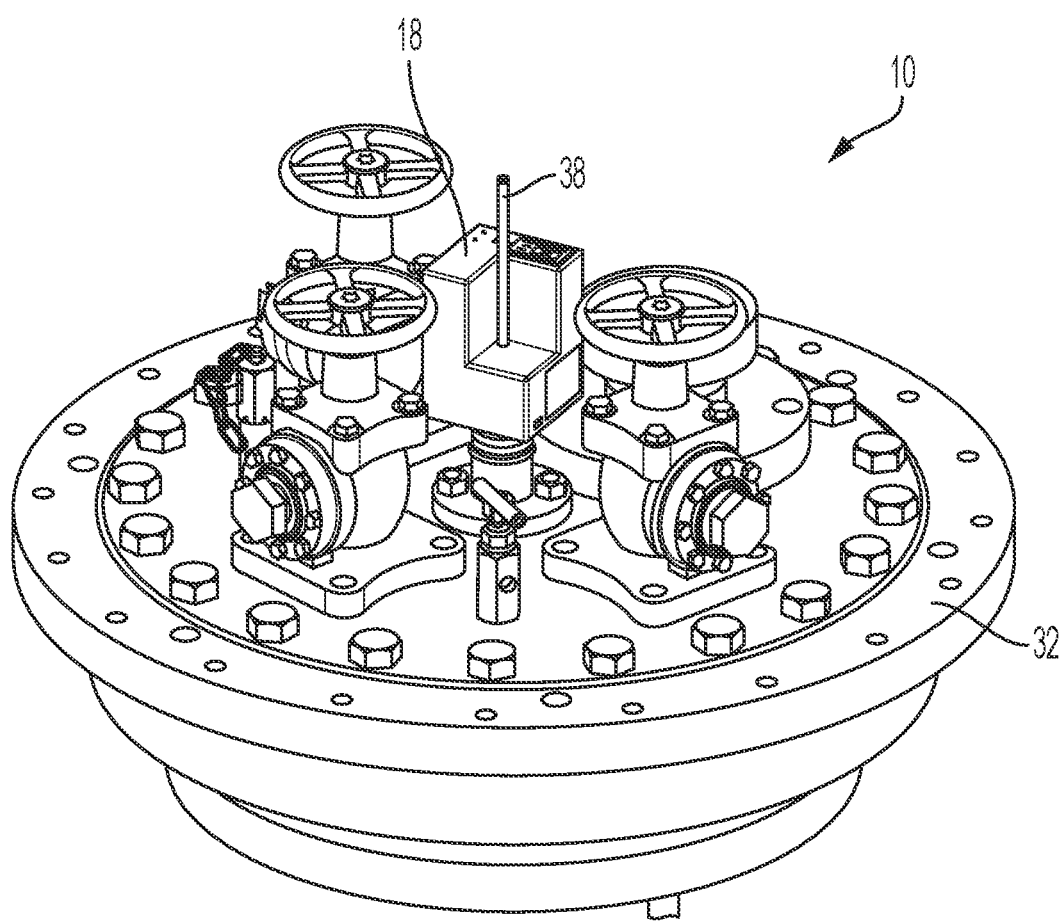
FIG. 9 illustrates a manway cover plate for a tank car with the linear displacement measurement system installed thereon.

FIG. 9 shows a typical manway cover plate arrangement with loading/unloading valves and the industry standard liquid level gauging device in the center. The RFID reader 18 and antenna 16 unit of the present invention is mounted onto an industry standard rail tank car liquid level gauging device body located in the center of the cover plate.

Another option of RFID linear displacement measurement system to the tank car liquid level gauging device is that the RFID reader unit will provide an adjusted liquid level measurement output due to a change in the liquid's specific gravity. As the specific gravity changes due to temperature, the float buoyancy (of the railroad tank car liquid level gauging device) in the liquid product changes. The tank car loading operator can enter the new specific gravity of the liquid product into the reader, either by a thumbwheel selector or via Bluetooth or other wireless connection to a handheld device. Once the new specific gravity is entered, the reader will transmit a corrected liquid level output signal due to the new resulting float line.

Also, by incorporating an optional RFID temperature measurement transponder (not shown) into the plurality of transponders strip, temperature measurement of the liquid can be obtained and transmitted.

Another feature of this application of RFID linear displacement measurement to the tank car liquid level gauging device is to provide identification of the gauge rod. The gauge rod serial number and the tank car number(s) can be stored in the RFID transponder(s). The information is read by the reader and transmitted to an external computer. The software will look up the tank car build information in a database and compare the information transmitted from the reader against the information in the database to ensure a match. This will ensure the proper gauge rod is used for the correct tank car.

Other functionality of the rail tank liquid level gauging device application of the RFID linear displacement measurement invention is to transmit this information to a wireless handheld device (e.g., cell phone), wirelessly to a local computer or through a router to a cloud-based server.

Yet another possible function is to transmit the liquid level and temperature to a control unit to provide automatic shutoff of the loading once the tank is full.

Yet another feature of the system may be to provide multiple RFID reader monitoring capabilities. Each RFID reader may be assigned a unique IP address and transmit its data to a configurable user interface (UI) on a computer. This may enable the tank car loading operation personnel to view and monitor multiple loading or unloading locations at once, improving operational efficiency and response.

Whereas, the invention has been described in relation to the drawings attached hereto, it should be understood that other and further modifications, apart from those shown or suggested herein, may be made within the scope of this invention.

What is claimed is:

1. A linear displacement measurement system, which comprises:
    a plurality of RFID transponders arranged in a linear array;
    a movable reciprocating device upon which said plurality of RFID transponders are mounted;
    a stationary RFID reader configured to wirelessly receive data from said plurality of RFID transponders; and
    a central processing unit and memory in communication with said stationary RFID reader configured to convert data from said RFID transponders to position information and linear displacement information of said movable device;
    wherein said data is stored in said memory such that said central processing unit may determine a direction of travel of said movable reciprocating device by comparing received data with previous data.

2. The linear displacement measurement system as set forth in claim 1 wherein said movable device reciprocates linearly parallel to said linear array of said plurality of RFID transponders.

3. The linear displacement measurement system as set forth in claim 1 wherein said plurality of RFID transponders are each arranged at a fixed distance apart.

4. The linear displacement measurement system as set forth in claim 1 wherein said central processing unit collects said data from said RFID reader.

5. The linear displacement measurement system as set forth in claim 1 wherein said plurality of RFID transponders are arranged on a strip affixed to said movable device.

6. The linear displacement measurement system as set forth in claim 5 wherein said strip is a plastic adhesive tape.

7. The linear displacement measurement system as set forth in claim 1 wherein said RFID reader includes a stationary reader antenna.

8. The linear displacement measurement system as set forth in claim 7 wherein said RFID reader and said reader antenna are together encased in a housing.

9. The linear displacement measurement system as set forth in claim 1 wherein each RFID transponder in said plurality of RFID transponders is programmed with linear measurement data corresponding to the RFID transponder's position in said linear array.

10. A linear displacement measurement system, which comprises:
    a plurality of RFID transponders arranged in a linear array;
    a movable reciprocating device upon which said plurality of RFID transponders are mounted, wherein said movable reciprocating device is a gauge rod of a liquid level measuring device;
    a stationary RFID reader configured to wirelessly receive data from said plurality of RFID transponders; and
    a central processing unit and memory in communication with said stationary RFID reader configured to convert data from said RFID transponders to position information and linear displacement information of said movable device.

11. The linear displacement measurement system as set forth in claim 9 further comprising a liquid float wherein movement of said float translates to movement of said gauge rod.

12. The linear displacement measurement system as set forth in claim 10 further comprising a temperature sensor.

13. A method to measure linear displacement, which method comprises:
    affixing a plurality of RFID transponders arranged in a linear array on a movable reciprocating device;
    wirelessly receiving data from said plurality of RFID transponders at a stationary RFID reader as said device moves;
    converting said data from said plurality of RFID transponders with a central processing unit and memory into position information and linear displacement of said movable device;
    wherein said data is stored in said memory such that said central processing unit may determine a direction of travel of said movable reciprocating device by comparing received data with previous data.

14. The method to measure linear displacement as set forth in claim 13 wherein said movable device reciprocates linearly parallel to said linear array of said plurality of RFID transponders.

15. The method to measure linear displacement as set forth in claim 13 wherein said plurality of transponders are arranged at fixed distances apart.

16. The method to measure linear displacement as set forth in claim 13 wherein said plurality of RFID transponders are arranged on a strip affixed to said movable device.

17. The method to measure linear displacement as set forth in claim 16 wherein said strip is a plastic adhesive tape.

18. The method to measure linear displacement as set forth in claim 13 wherein each RFID transponder in said plurality of RFID transponders is programmed with linear measurement data corresponding to the RFID transponder's position in said linear array.

* * * * *